US 6,735,626 B1

(12) United States Patent
Tezuka et al.

(10) Patent No.: US 6,735,626 B1
(45) Date of Patent: May 11, 2004

(54) NETWORK MANAGING METHOD AND SYSTEM

(75) Inventors: Satoru Tezuka, Yokohama (JP);
Shigeru Miyake, Yokohama (JP);
Satoshi Miyazaki, Yamato (JP); Keizo Mizuguchi, Kanagawa-ken (JP); Akio Shigeta, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/536,640

(22) Filed: Mar. 28, 2000

Related U.S. Application Data

(63) Continuation of application No. 08/971,621, filed on Nov. 17, 1997, now Pat. No. 6,047,320.

(30) Foreign Application Priority Data

Nov. 15, 1996 (JP) .............................................. 8-304885

(51) Int. Cl.[7] .......................................... G06F 15/173
(52) U.S. Cl. ...................... 709/223; 709/224; 709/225; 709/100; 709/228; 714/4; 714/21; 714/25; 714/30; 345/853; 370/396; 370/397; 370/400
(58) Field of Search ....................... 709/100, 221–225, 709/228; 370/396, 397, 400; 345/853; 714/4, 21, 25, 30

(56) References Cited

U.S. PATENT DOCUMENTS 5,295,244 A * 3/1994 Dev et al. .................... 345/853
5,751,967 A * 5/1998 Raab et al. ................... 709/228

FOREIGN PATENT DOCUMENTS

| JP | 2277334 | 11/1990 |
| JP | 7334445 | 12/1995 |
| JP | 8251163 | 9/1996 |

OTHER PUBLICATIONS

S. Ushijima, et al "A Study on Virtual LAN Service Architecture over ATM Based Connectionless Data Networks", The Institute of Electronics Information and Communication Engineers, Technical Report of ICICE, 1994, pp. 45–50.

* cited by examiner

Primary Examiner—Robert B. Harrell
Assistant Examiner—Hieu Le
(74) Attorney, Agent, or Firm—Antonelli, Terry, Stout & Kraus, LLP

(57) ABSTRACT

A network managing method which divides a network to be managed into a plurality of virtual closed area networks, and defines management information on the virtual closed area networks separately in a plurality of logical hierarchies. A virtual LAN/network space defines a connection state among closed area networks, a closed area space defines attribute information on nodes within a closed area network, and a virtual service defines logical arrangement information on nodes in the overall network. The management information is distributively stored in each node and utilized for MAC control. When the configuration of the network is changed due to movements of nodes, an administrator inputs the contents of the change from the manager of each layer, so that the manager communicates with a node containing corresponding management information to instruct the node to update management information.

14 Claims, 9 Drawing Sheets

FIG. 13

|   | NODE ID | GROUP | MAC ADDRESS |
|---|---------|-------|-------------|
| 1 | TERM 1  | 4     | × × ×       |
| 2 | PRT 1   | 4     | × × ×       |
| 3 | ATM 1   | 4     | × × ×       |
|   | ⋮       | ⋮     | ⋮           |

FIG. 14A

|   | USER ID | POSITION UNIT | NODE ID |
|---|---------|---------------|---------|
| 1 | B       | 405U          | TERM 1  |
| 2 | C       | 405U          | TERM 2  |
| 3 | D       | 405U          | TERM 3  |
|   | ⋮       | ⋮             | ⋮       |

FIG. 14B

|   | POSITION UNIT | GROUP |
|---|---------------|-------|
| 1 | 405           | 4     |
| 2 | 501           | 5     |
|   | ⋮             | ⋮     |

NETWORK MANAGING METHOD AND SYSTEM

This is a continuation of application Ser. No. 08/971,621 filed Nov. 17, 1997 now U.S. Pat. No. 6,047,320.

CROSS-REFERENCE TO RELATED APPLICATION

This application relates to U.S. patent application Ser. No. 08/799759 filed on Feb. 12, 1997 by Satoru Tezuka et al. entitled "SYSTEM FOR OPERATING AND MANAGING VIRTUAL NETWORK", and assigned to the present assignee. The content of that application is incorporated herein by reference.

BACKGROUND OF THE INVENTION

1. Field of the Invention

The present invention relates to techniques for managing a network, and more particularly to techniques for registering and updating management information which defines operations of a variety of information processing devices on a switched network.

2. Description of the Related Art

In a shared media network such as Ethernet, the network is generally managed on physical components of the network. Management information utilized for monitoring of the configuration and operational situation of the network, communication control, and so on is also managed collectively for all components on the network. The management information may be related to each other in a complicated manner. Particularly, a large scaled network involves complicated registration and update operations requiring a large number of steps which must be performed by an administrator when the configuration of the network is modified.

Switched networks, which utilize ATM (Asynchronous Transfer Mode) techniques to realize faster communications, have been increasingly spread in the art. A switched network may be represented by a logical configuration in addition to a physical configuration defining actual network components. It is also possible to divide a physical network into a plurality of closed area networks, each of which may be managed as an independent network. In this configuration, management information may also be managed for each closed area network. Such a logical network is referred to as a "virtual network". A construction and management of a virtual network is described in detail in "Rush into Virtual LAN" in Nikkei Communication, Nov. 21 1994 issue.

In an organization of an enterprise and so on, positions of employees may be frequently changed due to personnel changes or the like. With personnel changes, information processing devices such as personal computers, workstations, and so on may be moved to new offices together with their users. According to the prior art mentioned above, management information can be easily updated as long as modifications are limited to the configuration internal to each closed area network forming part of a switched network. The prior art, however, does not at all take into account registration and update operations for modifications to the configuration, due to changes in positions of the users or the like, which involve a plurality of closed area networks, i.e., virtual networks.

SUMMARY OF THE INVENTION

It is therefore an object of the present invention to provide a network managing method and system which allow an administrator to easily register and update management information even when the configuration of a network is modified over a plurality of related virtual closed area networks.

The present invention provides a network managing method and system for use in a network having a plurality of communication terminals and at least one switch circuit for controlling communications between the communication terminals for registering and updating management information which defines the operations of the communication terminals and the switch circuit. The method defines a plurality of virtual closed area networks each having the communication terminal or the switch circuit selected in accordance with a predetermined rule, and defines the management information for each of a plurality of logical hierarchies segmented in accordance with a predetermined rule. The communication terminals and the switch circuit each belong to one of the closed area networks or the logical hierarchies, and have storage means for storing management information on the closed area network or the switch circuit to which it belongs. At least one of the communication terminals communicates management information to be registered and updated among the communication terminals and the switch circuit, which store the management information to be registered and updated, based on inputted information, and manages the registration and update of the management information for each of the closed area networks and for each of the logical hierarchies.

The network managing system according to the present invention defines a network having a switch circuit based on a logical configuration, and defines management information on the network for each virtual closed area network and for each logical hierarchy for management. In addition, the management information can be registered and updated also on each logical hierarchy. Since the management information is managed in a more simple form on each logical hierarchy, the administrator can easily carry out registration and update operations for the management information even when the configuration of the network is modified over a plurality of closed area networks.

BRIEF DESCRIPTION OF THE DRAWINGS

FIG. 13 is a table showing the structure of a node management table; and

FIGS. 14A and 14B are tables illustrating the structures of a user table and a position unit table, respectively.

DESCRIPTION OF THE PREFERRED EMBODIMENTS

The present invention will hereinafter be described in connection with preferred embodiments thereof with reference to the accompanying drawings.

Figure 1:
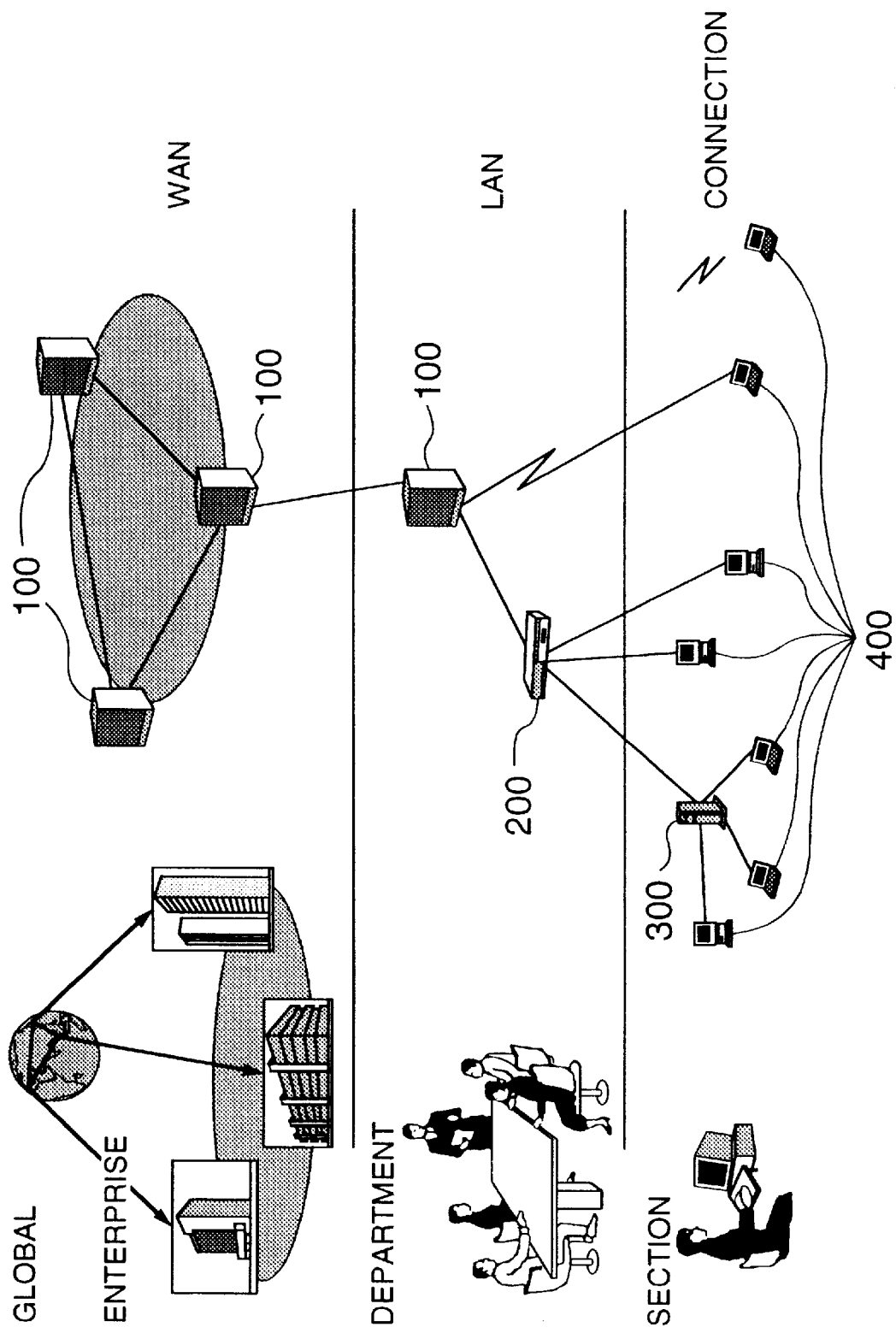
FIG. 1 is a diagram illustrating a general configuration of managed objects in a network management system according to one embodiment of the present invention.

FIG. 1 illustrates an exemplary configuration of a network to which a network managing system according to one embodiment of the present invention is applied. The network illustrated in FIG. 1 comprises a WAN (wide area network) and a LAN (local area network) which basically configure a switched network. As a switch circuit for line control, the WAN is provided with ATM exchangers 100, while the LAN is provided with an ATM exchanger 100, a switching HUB 200, and so on. The network is also provided with a server 300, a plurality of client 400, and so on as communication terminals. The server 300 and the clients 400 directly connected thereto constitute a shared media network. In the following description, line concentrators such as switch circuits and communication terminals, forming parts of the network, are referred to the "nodes".

The network managing system of this embodiment is realized by managers and agents (later described) provided in the above-mentioned nodes, and addresses the management of the overall network ranging from a global network to a local network, as illustrated in FIG. 1. Also, the network management of this embodiment defines the network as a logical configuration, where management information on respective communication devices within the network is managed independently for each of a plurality of logical hierarchies and for each of virtual networks (closed area networks).

Figure 2:
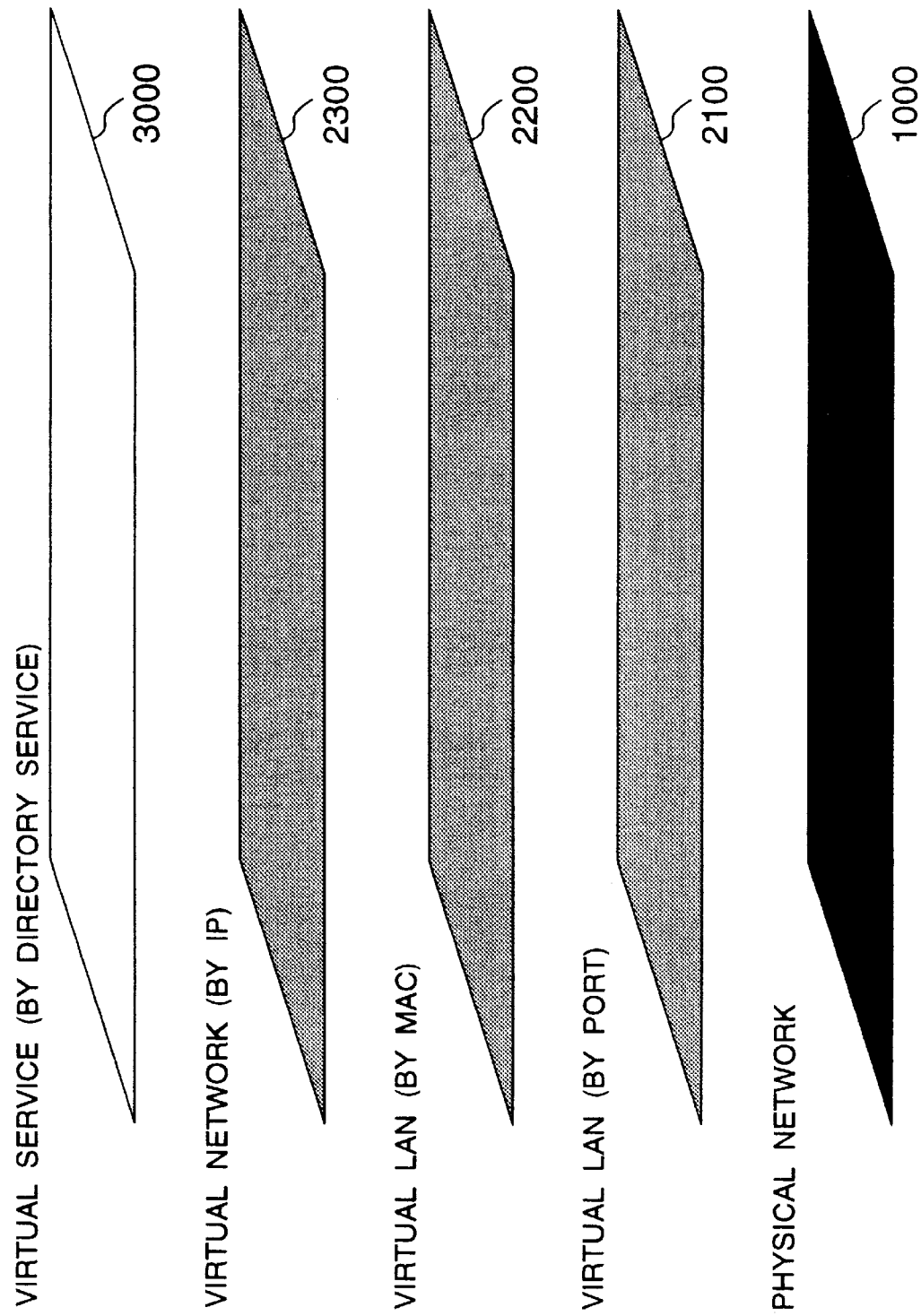
FIG. 2 is a diagram illustrating the structure of a logical hierarchy.

FIG. 2 illustrates an example of logical hierarchies. In FIG. 2, while the configuration of a network is generally defined by a physical network space 1000, the network managing system of this embodiment defines the configuration of a switched network by a plurality of logical network spaces. The logical network spaces include, for example, a virtual LAN space (by Port) 2100 for setting and defining communication ports of each node; a virtual LAN space (by MAC) 2200 for setting and defining communication interfaces of each node; a virtual network space (by IP) 2300 for setting and defining a communication protocol of each node; and a virtual service space (by Directory Service) 3000 for defining management information related to the directory configuration of each node in the network. The virtual LAN space (by Port) 2100, the virtual LAN space (by MAC) 2200, and the virtual network space (by IP) 2300 realize closed area characteristics of the virtual networks, so that the internal configuration of each virtual network can be managed independently of each other. However, management information of these network spaces 2100, 2200, 2300 is registered subordinate to the registration of management information of the virtual service space (by Directory Service) 3000.

Next explained is a concept of a managing method employed in the network managing system of this embodiment.

In an organization having hierarchically structured posts such as units, departments, and divisions of an enterprise, a higher level organizational unit is composed of a set of lower level organizational units, wherein it is often the case that an access right to the network and so on are also set in organizational units. In contrast, the network managing system of this embodiment manages the configuration of the network in organizational units assigned to respective nodes, rather than based on a physical arrangement of respective nodes.

Figure 3:
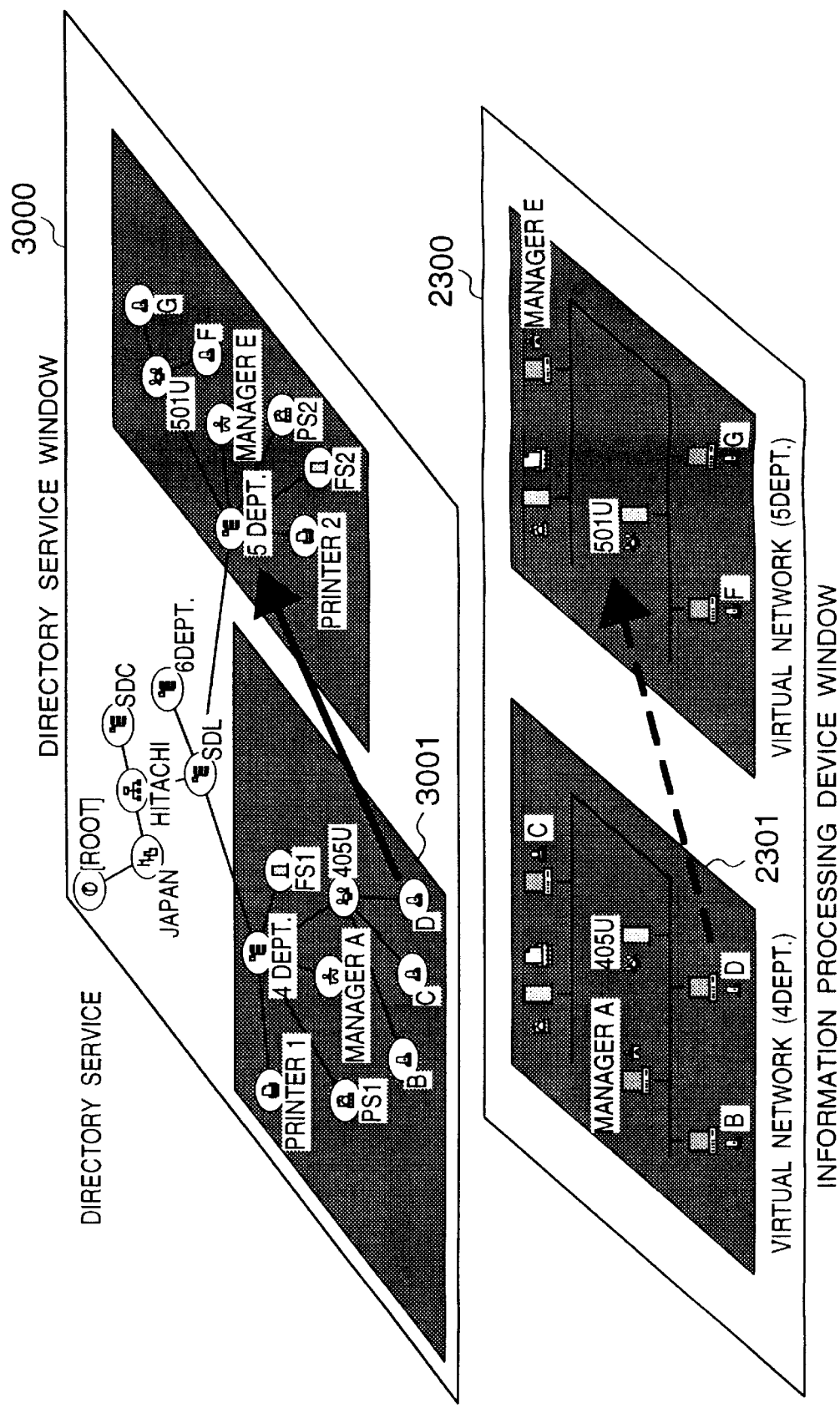
FIG. 3 is a diagram illustrating a directory service window and an information device window.

FIG. 3 illustrates an example of management information defined by a logical network space. In FIG. 3, a directory service window 1001 shows an example of the contents registered in the virtual service space (by Directory Service) 3000, where a network is represented by a logical hierarchical structure in organizational units. This management information may be created using a directory service (such as, for example, NDS manufactured by Novell Inc.) conforming to ITU-T x.500 series. An information processing device window 3000 shows an example of the contents registered in the virtual network space (by IP) 2300, and represents the configuration of each virtual network.

The directory service window 3000 configures a directory tree including all of associated networks. In this embodiment, the directory tree represents a world-wide network through Internet and so on, where the highest directory "Root" represents the earth. Below "Root", there is "Japan" indicative of Japan followed by "HITACHI" indicative of an enterprise. Further, below "HITACHI", there are "SDL" and "SDC" indicative of divisions of the company, and further below the divisions, there are "4Dept." and "5Dept." indicative of departments. In this example, the virtual network is built in units of departments. Further below the department "4Dept.", there are an administrator "ManagerA", a unit "405U", and a file server "FS1", a print server "PS1", and a printer "Printer1" used in the department. Below the unit "405U", users "B", "C", "D" are registered. Similarly, below the department "5Dept.", there are an administrator "ManagerE", a file server "FS2", a print server "PS2" and a printer "Printer2" used in the department, and a unit "501U". In addition, users "F", "G" are registered below the unit "501U".

The information processing device window 2300 displays respective virtual networks of the department "4Dept." and the department "5Dept". A virtual network (4Dept.) and a virtual network (5Dept.) correspond to the departments "4Dept." and "5Dept." in the directory service window 3000, respectively, and their components also correspond to those in the directory service window 3000. It is assumed in this embodiment that each user has one set of information processing devices.

Next, the configuration and operation of the network managing system of this embodiment will be described in detail.

Figure 4:
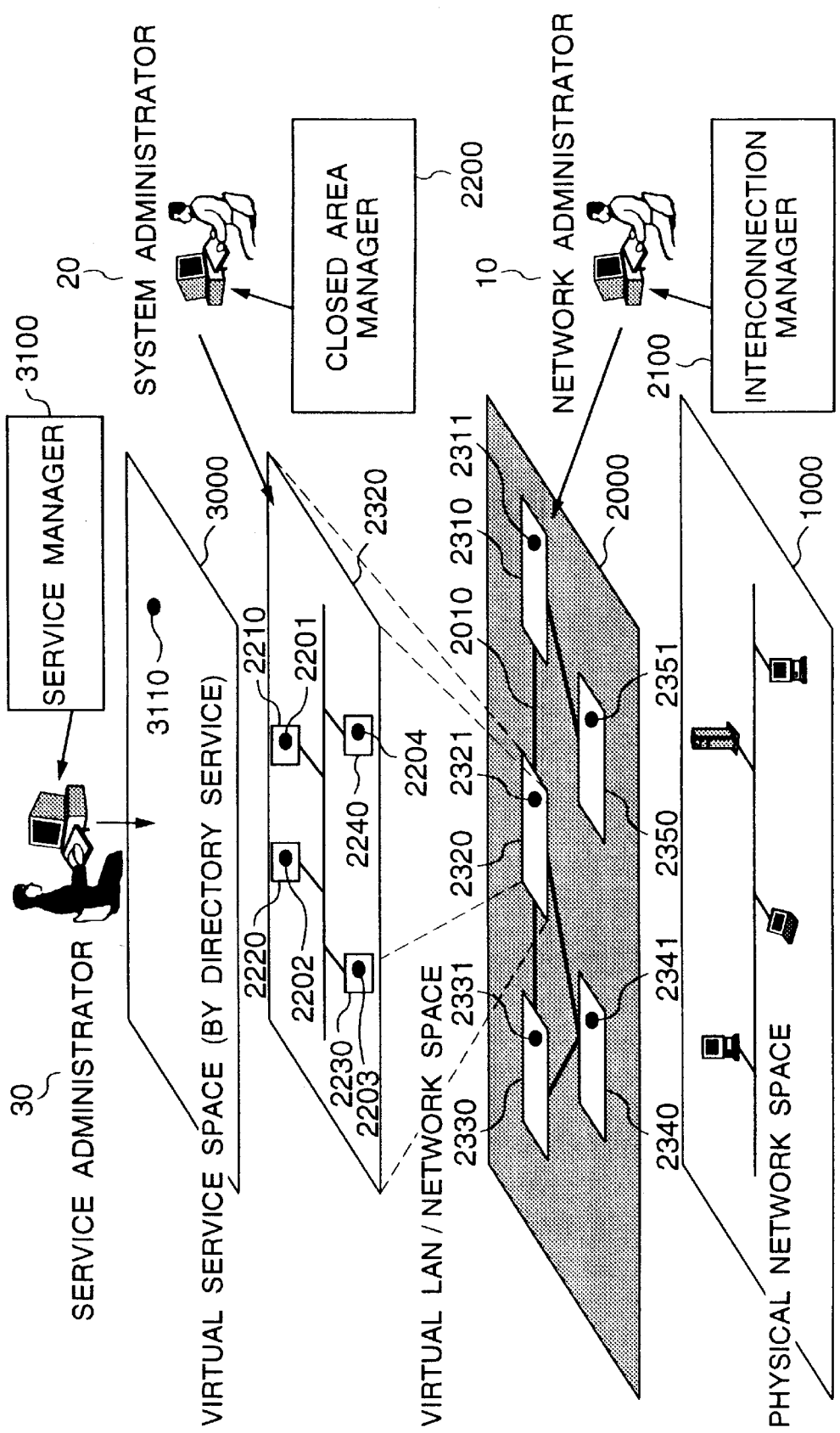
FIG. 4 is a diagram illustrating an exemplary configuration of a network managing system.

FIG. 4 is a diagram illustrating a network managing form provided by the network managing system of this embodiment. In FIG. 4, a network to be managed is divided into and separately defined as a virtual LAN space/network space 2000 and a virtual service space 3000. The virtual LAN space/network space 2000 corresponds to any or a combination of the Virtual LAN (by Port) layer 2100, the Virtual LAN (by MAC) layer 2200, and the Virtual Network (by IP) layer 2300 in FIG. 2. The virtual service space 3000 and the Physical Network space 1000 correspond to the Virtual Service layer 3000 and the Physical Network layer 1000 in FIG. 2, respectively. In the virtual LAN/network space 2000, a plurality of virtual networks 2310, 2320, 2330, 2340, 2350, having closed area characteristics, and their connection states are defined. A path 2101 in the figure indicates that the virtual networks 2310, 2320 are connected to each other such that they can communicate through the path 2101. Here, the configurations of nodes 2210, 2220, 2230, 2240 in each virtual network are managed by a system administrator 20, while the connection between the virtual networks is managed by a network administrator 10. In addition, the virtual service space 3000 is managed by a service administrator 30.

A manager, which provides a man-machine interface with an operator (administrator), receives instructions from the operator and issues instructions to an associated agent. The agent, on the other hand, reflects the instructions from the manager to its node, and informs the manager of its node state when requested by the manager or when its node has changed. Both the manager and the agent are software programs executed by processors in associated nodes. Management information is stored in the form of table in a memory of an associated node. Communications between a manager and an agent may be made in accordance with an existing protocol such as SNMP (Simple Network Management Protocol), HTTP, and so on.

In FIG. 4, a manager and a plurality of agents exist in each space. An agent may also exist in a node having a manager function. Also, one node may have a manager function for a plurality of spaces.

(1) Management of Virtual LAN/Network Space

At least one node, which is a line concentrator, in each of the virtual networks 2310, 2320, 2330, 2340, 2350 in FIG. 4 is provided with the function of an interconnection agent 2311, 2321, 2331, 2341, or 2351. Also, a node has the function of an interconnection manager 2100. The interconnection manager 2100 has functions of grouping nodes in a network and defining the interconnection of virtual networks. The interconnection manager 2100 has a node management table shown in FIG. 13. The node management table has node IDs of nodes constituting a network, their position groups, and MAC addresses on the network.

Figure 5:
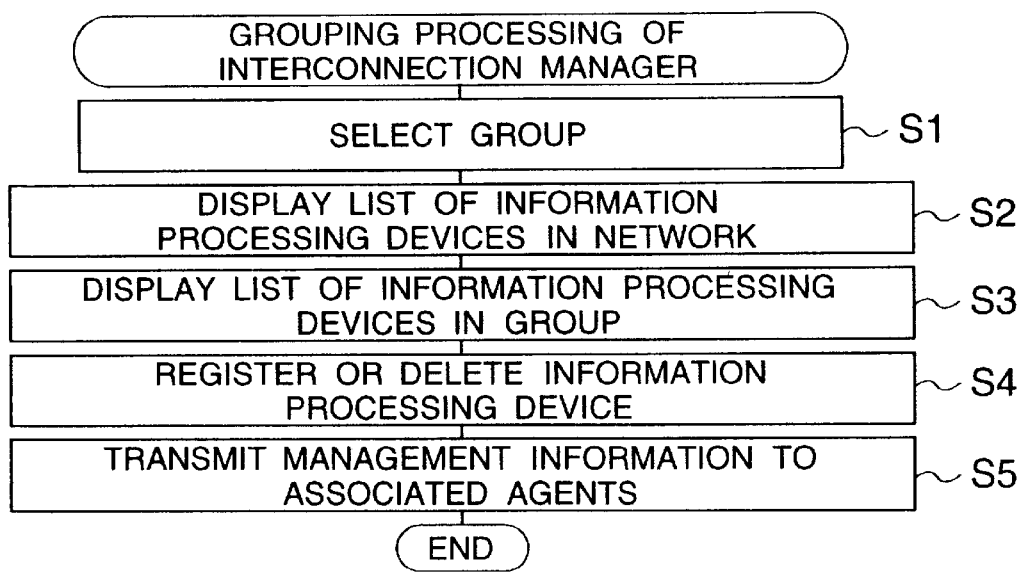
FIG. 5 is a flow chart representing the grouping processing executed by an interconnection manager.
Figure 6:
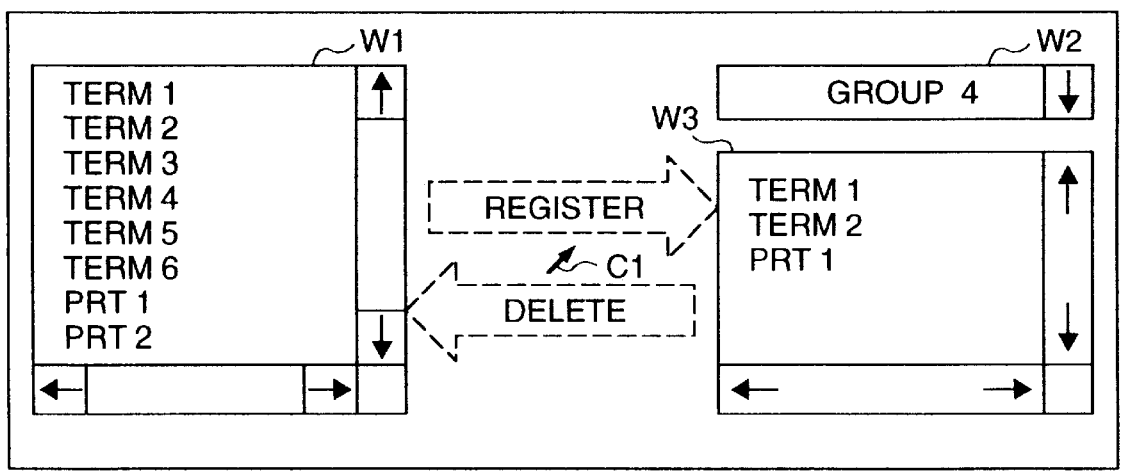
FIG. 6 is a diagram illustrating an example of an operation screen on which the grouping processing is executed.

Next, how the network administrator 10 performs the grouping of nodes in the network will be explained with reference to FIGS. 5 and 6. FIG. 5 illustrates a processing flow executed by the interconnection manager 2100 for performing the grouping, and FIG. 6 illustrates an operation screen. The interconnection manager 2100 receives from the network administrator 10 the designation of a group (a department in this embodiment) which is the constituent unit of the virtual network on a window W3 (S1). Then, the interconnection manager 2100 displays a list of all node IDs within the network from the node management table on a window W1 (S2), and displays a list of information processing devices belonging to the designated group 4 on the window W3 (S3). Subsequently, registration or deletion of a node selected by a cursor C1 is performed for the designated group 4 (S4). Here, a node selected on the window W1 is newly registered in the group 4, while a node selected on the window W3 is deleted from the registration in the group 4. After the registration and deletion of nodes have been completed, the node management table is modified, and management information indicative of the contents of the modification is produced and transmitted to interconnection agents of associated nodes (S5). On the other hand, an agent, upon receiving the management information, updates management information stored in its node based on the received management information. The display of nodes may be performed in any method such as an icon-based graphical display or the like, in addition to the display in a list form, as long as the network administrator 10 can easily understand it. In addition, any component unit in the virtual network may be designated as the group instead of the department. Thus, the group need not be always designated in departments.

Figure 7:
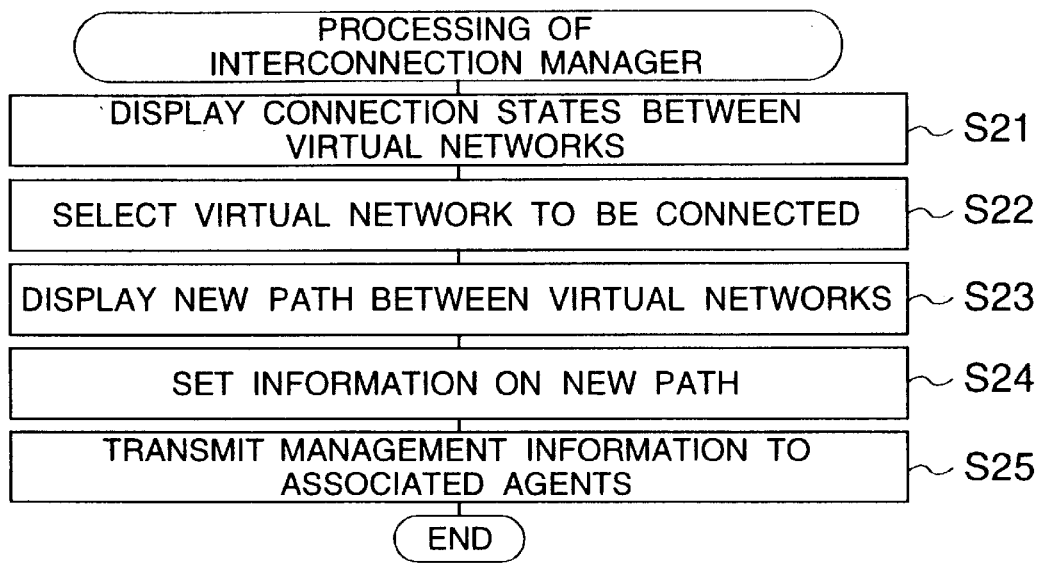
FIG. 7 is a flow chart representing the processing executed by an interconnection manager.
Figure 8:
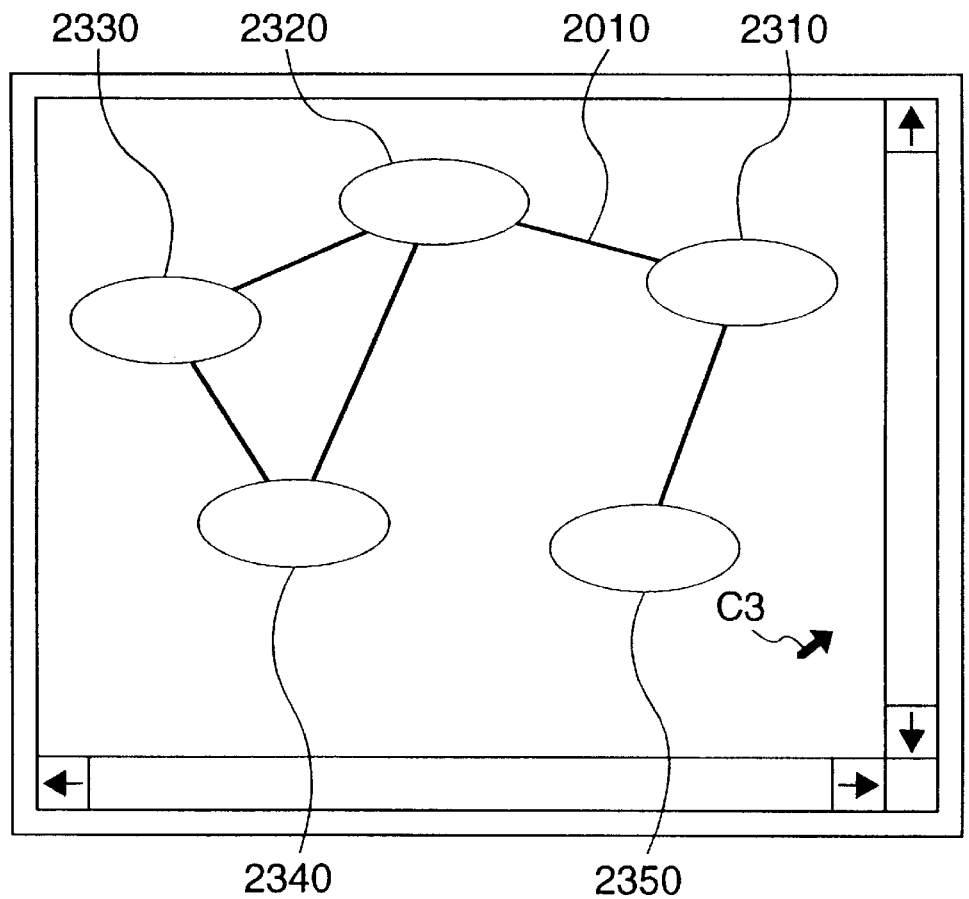
FIG. 8 is a diagram illustrating an operation screen on which the interconnection agent is executing the processing of FIG. 7.

Next, how the network administrator 10 defines the interconnection of the virtual networks will be explained with reference to FIG. 7 which illustrates a processing flow executed by the interconnection manager 2100 for setting and updating the interconnection. The interconnection manager 2100 first requests interconnection agents to provide management information, utilizing the MAC addresses on the node management table of FIG. 13, and displays all virtual networks and their connection states based on the management information provided thereto (S21). Then, the interconnection manager 2100 receives the designation of a newly connected virtual network (S22), and newly displays a path for interconnecting the designated virtual network with existing virtual networks (S23). FIG. 8 illustrates that a new path 2010 is newly displayed by the processing step S23. Then, the interconnection manager 2100 receives update information on the new path 2010 (S24), and transmits management information indicative of the set contents to interconnection agents of the connected virtual networks (S25). In this way, the interconnections between virtual networks is realized. The function of the above-mentioned interconnection can be realized by a personal computer, a workstation, or the like which has an operating system including a network communication management function. On the other hand, the interconnection agent 2311, which has received the management information, updates management information contained in its own node for defining the interconnection between virtual networks based on the received management information.

(2) Management of Closed Area

Referring back to FIG. 4, all nodes in the respective virtual networks have the function of a closed area agent such as 2201, 2202, 2203, 2204, 2205. Also, one node in the respective virtual networks has the function of the closed area manager. The closed area manager reads, sets, and updates management information (desk top information) on each node in the virtual network.

Figure 9:
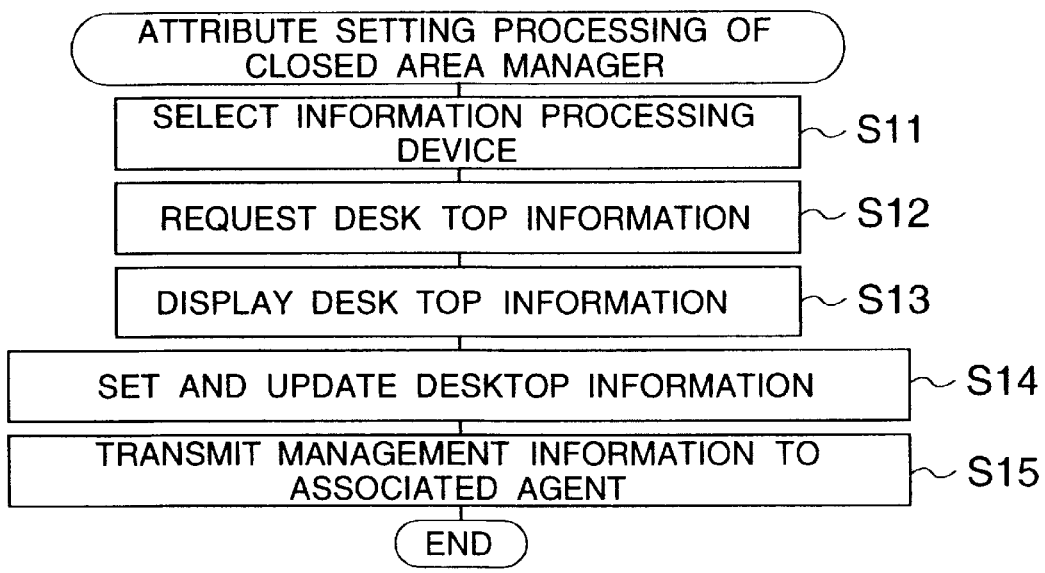
FIG. 9 is a flow chart representing the processing executed by the closed area manager for setting attributes.
Figure 10:
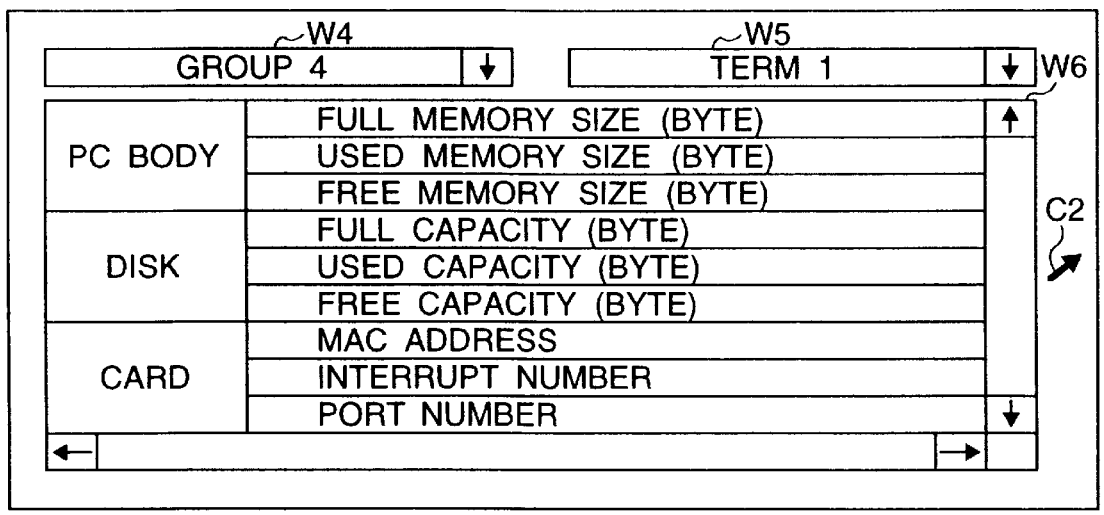
FIG. 10 is a diagram illustrating an example of an operation screen on which the processing of FIG. 9 is executed.

Next, how the system administrator 20 sets and updates management information (desk top information) on each node in the virtual network will be explained with reference to FIGS. 9 and 10. FIG. 9 illustrates a processing flow executed by the closed area manager 2200 when the management information is set and updated, and FIG. 10 illustrates an operation screen displayed when the processing flow is executed. The closed area manager 2200 receives the designation of a group in a window W4 and a node in a window W5 in FIG. 10 (S11). Then, the closed area manager 2200 requests an agent of the designated node to provide desk top information utilizing the MAC addresses on the node management table of FIG. 13 (S12), and displays provided desk top information in a window W6 (S13). The closed area manager 2200 receives a selection of information within the window W6 and new set values through a cursor C2 or a keyboard, and accepts the setting and update of the desk top information (S14). Subsequently, updated desk top information is transmitted to the closed area agent of the associated node (S15). The closed area agent, in turn, updates its desk top information based on the received management information.

(3) Management of Virtual Service Space

Referring back to FIG. 4, each virtual network includes a node having the function of a service managing agent 3110 and a managing node having the function of the service manager. The service managing agent 3110 hierarchically stores and manages information on the arrangement of all nodes included in a network to be managed thereby. The node arrangement information may be built using NDS of Novell Inc. or the like. The service manager 3100 has a function of managing a network in units of users and positions instead of devices (nodes). For this purpose, the service manager 3100 has a user table, shown in FIG. 14A, for indicating the correspondence between a user ID, a position unit, and a node ID, and a position unit table, shown in FIG. 14B, for indicating the correspondence between a position unit and a group.

Figure 11:
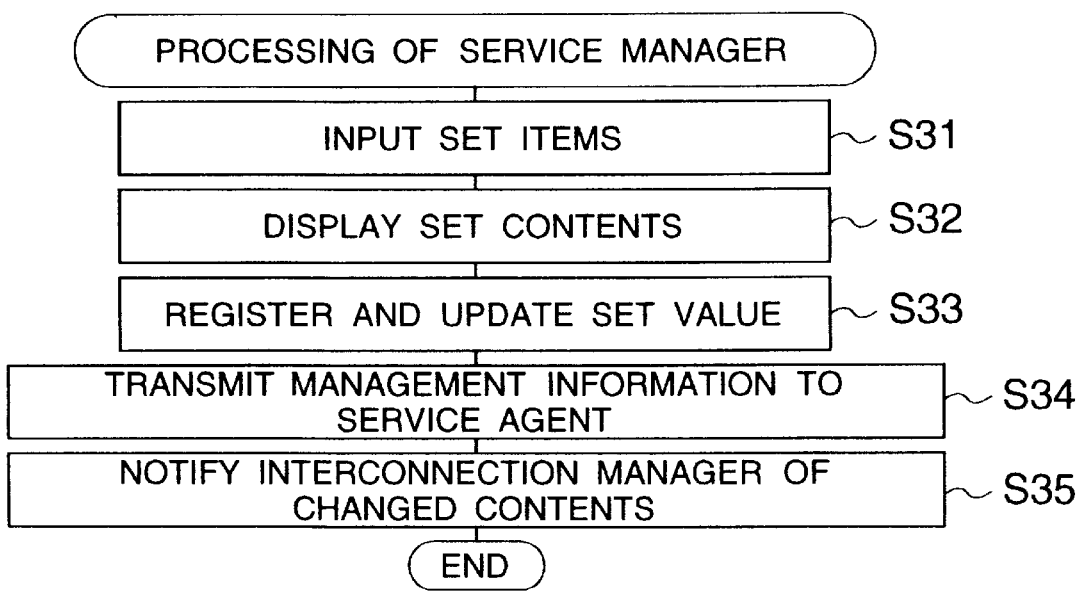
FIG. 11 is a flow chart representing the processing executed by a service manager.
Figure 12:
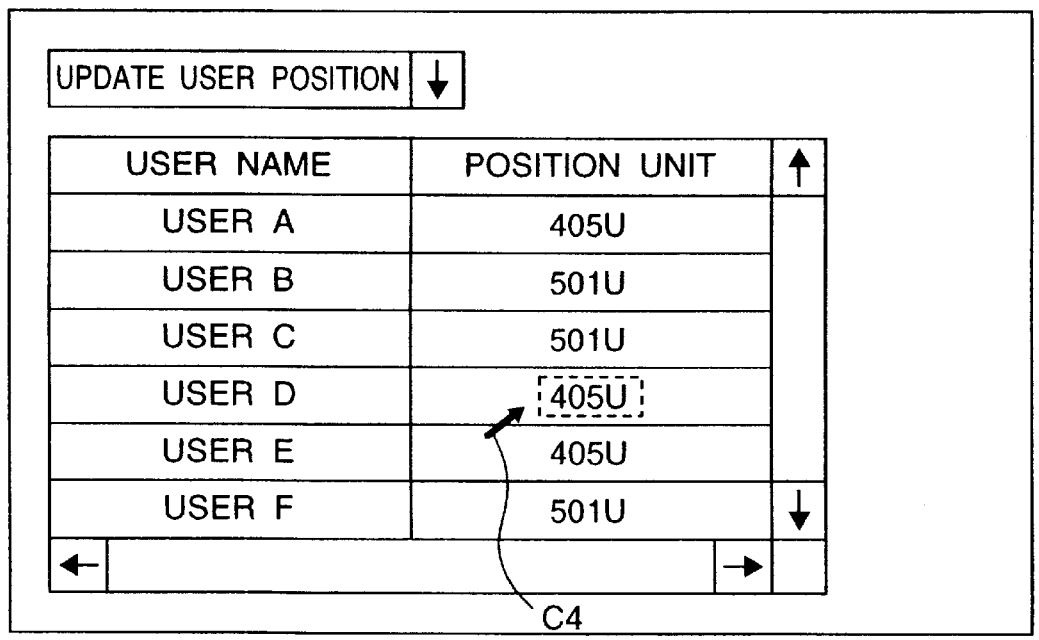
FIG. 12 is a diagram illustrating an operation screen on which the service manager is executing the processing of FIG. 11.

Next, how the service administrator 30 sets and updates directory service information on the network utilizing the service manager 3100 will be explained with reference to FIGS. 11 and 12. FIG. 11 illustrates the processing executed by the service manager 3100, and FIG. 12 illustrates an operation screen displayed when the processing is executed. When set items such as changes in positions of users, changes in positions of nodes, and so on are designated (S31), the service manager 3100 receives corresponding management information provided from the service agent 3110, and displays directory information (S32). Then, the service manager 3100 updates a setting at a displayed position designated by a cursor C4 (S33). In FIG. 12, the position of a user D is selected for update on the operation screen which is displayed for changing the positions of users. Next, the service manager 3100 modifies the user table, and transmits management information indicative of the updated contents to the service agent 3110 (S34). The service agent 3110, in turn, updates directory information stored in its own node based on the received management information. Further, when a position unit is changed, a node ID corresponding to a user ID and groups corresponding to new and old pertinent sections are retrieved from the user table and the position unit table, and notified to the interconnection manager 2100 (S35). The interconnection manager 2100, upon receiving the notification, modifies the table and notifies the agent in a manner similar to the case where it receives an instruction from the network administrator 10.

Turning back to FIG. 3, assume herein that a user "D" 3001 belonging to the unit "405U" of the department "4Dept." and his information processing devices are moved to the unit "501U" of the department "5Dept.". The service administrator 30 performs the change illustrated in FIG. 12 in the service manager 3100. Subsequently, the service manager 3100 requests the service agent 3110 to update directory information, and requests the interconnection manager to change associated information. In this way, even when the configuration is modified over a plurality of virtual networks, the administrator can easily register and update management information.

The tables shown in this embodiment may be changed in a variety of forms depending on a method employed for configuring networks, the contents of information possessed by respective information processing devices for their communication functions. For example, the closed area manager, the interconnection manager, and the service manager may have information indicating how management information to be registered and updated is assigned to each node, and information on the addresses of nodes to which the management information is assigned, such that they designate the address information to communicate an agent of the associated node.

Alternatively, the closed area manger 2200 may be provided in each virtual network independently. Conversely, the closed area manager 2200, the interconnection manager 2100, and the service manager 3100 may be collectively arranged in a single managing node.

What is claimed is:

1. A network managing system for managing a network having a plurality of nodes, comprising:

physical network managing means for defining and managing a physical network;

closed area managing means for defining and managing each of a plurality of closed areas, each closed area including all nodes in each of a plurality of virtual and one of a plurality of virtual services, each virtual network including some of the nodes in the physical network and being a logical network overlapping the physical network;

service managing means for defining and managing the virtual services, each virtual service being a virtual hierarchical structure network for collectively managing relationships among the nodes and user and belonging information in the hierarchical structure network; and interconnection managing means for defining and managing each virtual network and each closed area on each virtual service, and interconnection between the virtual networks, wherein each node belongs to the physical network and at least one of the virtual networks, wherein each object of each virtual service defines and manages relation between a node of the physical network and a node of the virtual network, and wherein said respective managing means change their settings with respect to a change of a node of the physical network, a node of the virtual network, or an object of a virtual service and provides a notice of such change to a related managing means.

2. A network managing system according to claim 1, wherein said node is one of a terminal, a switch circuit, router, a switching node, and a bridge.

3. A network managing system according to claim 1, wherein the physical network managing means, the interconnection managing means, closed area managing means, and service managing means communicate with the associated nodes to exchange information respectively.

4. A network managing system according to claim 3, wherein said exchanged information includes:

a capability description of node which is sent from the node to the managing system;

a configuration parameter which is sent from the managing system to the node for changing and/or updating configuration of said node; and a status report which sent from said node to the managing system for reporting the status of the node and/or a result of changing the configuration in response to receipt of said configuration parameter.

5. A network managing system according to claim 1, wherein said interconnection managing means defines a group by selecting nodes in the network in response to user indication, stores the defined information, and transmits the defined information to associated nodes.

6. A network managing system according to claim 1, wherein said interconnection managing means displays current connection state between the virtual networks, updates the connection state in response to user indication, stores the updated connection state, and transmits it to associated nodes.

7. A network managing system according to claim 1, wherein said closed area managing means requires the node to send the managing information on the node in response to user indication, displays the managing information sent from the node, updates the managing information in response to the user input, and transmits the updated information to the nodes.

8. A network managing system according to claim 1, wherein said service managing means displays the current service information in response to user indication, registers or updates the service information in response to the user input, and transmits the update service information to associated nodes and the associated interconnection managing means.

9. A network managing system according to claim 1, wherein said network managing system is accomplished by a plurality of network devices.

10. A network managing method for managing a network having a plurality of nodes, comprising:
   a first step of defining and managing each virtual network, which includes some of said nodes in a physical network and is a logical network overlapping with the physical network, and interconnection between the virtual networks;
   a second step of defining and managing all nodes in each virtual network; and
   a third step of defining and managing a relationship among nodes and user and belonging information,
   wherein arrangement information on all nodes in the network is hierarchically managed, and
   wherein when a piece of hierarchically managed information is changed, a notice of the change and the contents of the change is transmitted to an upper layer and/or a lower layer information to reflect the change in said upper and/or lower layers.

11. A network managing method according to claim 10, wherein said first defining step comprises the steps of:
   defining a group by selecting nodes in the network in response to user indication;
   storing the defined information; and
   transmitting the defined information to associated nodes.

12. A network managing method according to claim 10, wherein said first defining step comprises the steps of:
   displaying current connection state between the virtual networks;
   updating the connection state in response to user indication;
   storing the updated connection state; and
   transmitting the updated connection state to associated nodes.

13. A network managing method according to claim 10, wherein said second defining step comprises the steps of:
   requiring the node to send the managing information of the node in response to user indication;
   displaying the managing information sent from the node;
   updating the managing information in response to the user input; and
   transmitting the updated information to the node.

14. A network managing system according to claim 10, wherein said third defining step comprises the steps of:
   displaying the current service information in response to user indication;
   registering or updating the service information in response to the user input; and
   transmitting the update service information to associated nodes.

* * * * *